(12) United States Patent
Koren

(10) Patent No.: US 6,484,952 B2
(45) Date of Patent: Nov. 26, 2002

(54) FIBER OPTIC ILLUMINATED WATERFALL

(75) Inventor: Pinhas Paul Koren, Altamonte Springs, FL (US)

(73) Assignee: Super Vision International, Inc., Orlando, FL (US)

( * ) Notice: Subject to any disclaimer, the term of this patent is extended or adjusted under 35 U.S.C. 154(b) by 0 days.

(21) Appl. No.: 09/742,927

(22) Filed: Dec. 20, 2000

(65) Prior Publication Data

US 2002/0074420 A1 Jun. 20, 2002

(51) Int. Cl.[7] .................................................. F21S 8/00
(52) U.S. Cl. .......................................... 239/18; 362/256
(58) Field of Search .............................. 239/18; 4/496; 362/562, 96

(56) References Cited

U.S. PATENT DOCUMENTS

| | | | |
|---|---|---|---|
| 3,644,922 A | 2/1972 | James et al. | |
| 4,208,096 A | 6/1980 | Glenn, Jr. | |
| 4,650,280 A | 3/1987 | Sedlmavr | |
| 4,749,126 A | * 6/1988 | Kessener et al. | 239/12 |
| 4,773,730 A | 9/1988 | Sedlmavr | |
| 4,786,139 A | 11/1988 | Sedlmavr | |
| 4,867,530 A | 9/1989 | Sedlmavr | |
| 4,901,922 A | * 2/1990 | Kessener et al. | 239/12 |
| 5,160,565 A | 11/1992 | Chazalon et al. | |
| 5,376,201 A | 12/1994 | Kingstone | |
| 5,430,825 A | 7/1995 | Leaman et al. | |
| 5,528,714 A | 6/1996 | Kingstone et al. | |
| 6,076,741 A | * 6/2000 | Dandrel et al. | 239/18 |
| 6,132,056 A | * 10/2000 | Ruthenberg | 239/18 |
| 6,152,381 A | * 11/2000 | Hones | 239/16 |
| 6,269,491 B2 | * 8/2001 | Zankow | 239/18 |

* cited by examiner

*Primary Examiner*—Lesley D. Morris
(74) *Attorney, Agent, or Firm*—Terry M. Sanks, Esq.; Beusse Brownlee; Bowdoin & Wolter, PA

(57) ABSTRACT

A waterfall illuminated by a plurality of optical fibers having their ends disposed into an outlet of the waterfall and directing light from the fiber ends onto water within the waterfall. The waterfall comprises a water conduit having an inlet for receiving water into the interior of the water conduit and having an outlet formed by a top plate and bottom plate for producing a waterfall as the water flows out of the water conduit, a fiber optic cable bundle attached to the water conduit, and the fiber optic cable bundle comprising a plurality of fibers where each fiber adapted to receive light at an input end and to emit light at an output end. The output ends of the respective fibers are disposed within the outlet whereby the output ends are positioned to direct light onto water in the outlet.

14 Claims, 2 Drawing Sheets

FIBER OPTIC ILLUMINATED WATERFALL

FIELD OF THE INVENTION

This invention relates generally to the field of fiber optic lighting, and more specifically to a method and apparatus for illuminating a waterfall for a pool or spa with a fiber optic light source.

BACKGROUND OF THE INVENTION

It is known to use a fiber optic light source to provide illumination for portions of a pool or water spa. Fiber optic cables are small and flexible and can be used to deliver light to locations that are impractical for other light sources. Importantly, the light source and its related electrical components can be located at a safe distance from the pool or spa water.

It is known to illuminate a waterfall of a pool or spa with fiber optic light. One such device uses a fiber optic cable bundle to provide light to an acrylic bar disposed along the edge of a waterfall. Light emanates from along the length of the acrylic bar and illuminates the water as it flows over the bar to form the waterfall. Another known device provides light from a side emitting fiber disposed along an edge of a waterfall. The side emitting fiber is installed into a waterfall structure and is provided with light from the end of an end emitting delivery fiber connected to the waterfall structure. However, the intensity of the light provided by these known devices is limited by the efficiency of the light transfer mechanisms used. Furthermore, the width of the waterfall must necessarily be limited in order not to reduce the intensity of the light, and in order not to produce a noticeable difference in intensity from one side of the waterfall to the other. For example, the devices described above are believed to be available for waterfalls up to only 24 inches wide.

Applicant has filed an application, application Ser. No. 09/630,500, which describes a method and apparatus for illuminating a waterfall where fiber optic fibers which receive light at an input end and emit light at an output end, are disposed proximate an outlet edge of a waterfall. It is believed that this invention is capable of illuminating a waterfall greater than 24 inches wide. However the illumination occurs at the outlet edge of the waterfall. Applicant believes that by applying illumination from fiber optic fibers inside a waterfall the effect will appear as though the water is illuminated as it leaves the waterfall.

SUMMARY OF THE INVENTION

Thus there is needed a method and apparatus for illuminating water inside a waterfall that provides a high intensity light and that is capable of illuminating a waterfall greater than 24 inches wide where the water appears illuminated.

Described herein is a waterfall apparatus comprising a generally rectangular shaped water conduit having an inlet for receiving water into the interior of the water conduit and having an outlet edge for producing a waterfall as the water flows out of the water conduit; a fiber optic cable bundle attached to the water conduit, the fiber optic cable bundle comprising a plurality of fibers, each fiber adapted to receive light at an input end and to emit light at an output end; wherein the output ends of the respective fibers are disposed within the outlet whereby the outlet ends are positioned to direct light onto water in the outlet.

Also described herein is a method of illuminating a waterfall, the method comprising the steps of providing a plurality of optical fibers, each fiber operable to receive light at an input end and to emit light at an output end, disposing the output ends of the respective fibers within the waterfall; and providing light into the input ends of the respective fibers.

DETAILED DESCRIPTION OF THE INVENTION

Figure 1:
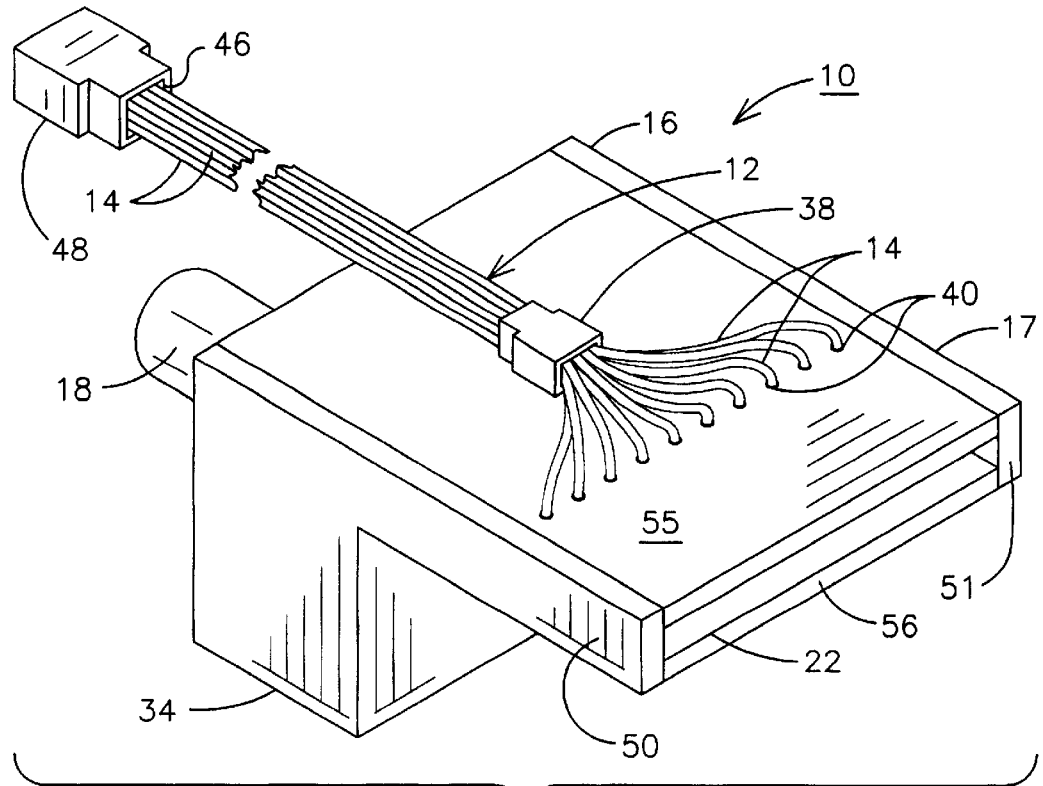
FIG. 1 is a perspective view of a waterfall apparatus having a plurality of end emitting fibers inside an outlet of a water conduit.
Figure 3:
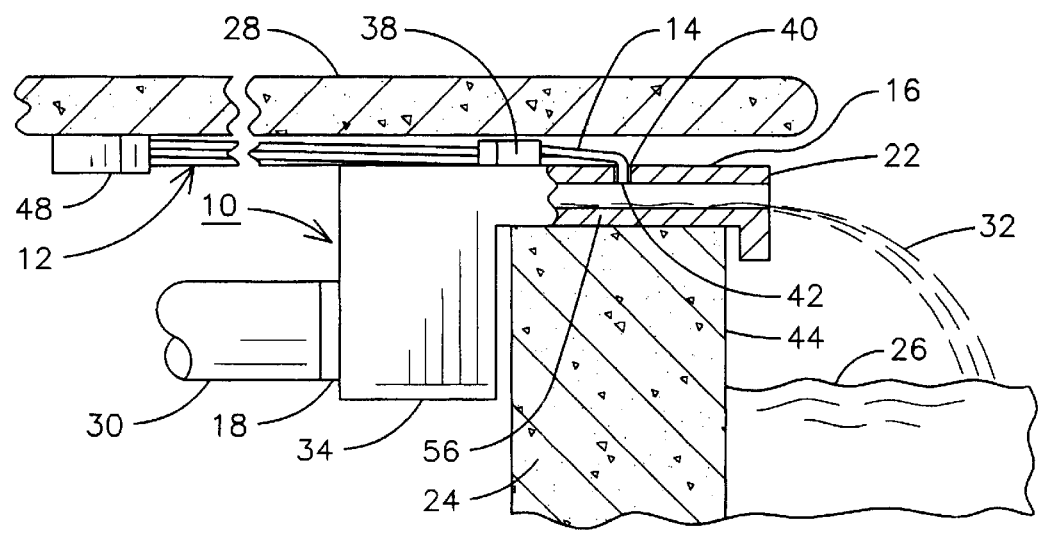
FIG. 3 is a sectional elevation view of the waterfall apparatus of FIG. 1 as it may be installed in a pool.

FIGS. 1 and 3 illustrates a waterfall apparatus 10 illuminated by a fiber optic cable bundle 12 containing a plurality of individual fibers 14. The waterfall apparatus 10 includes a generally rectangular shaped water conduit 16 having an inlet 18 for receiving water into the interior of the waterfall apparatus 10 and an outlet 17. The outlet has a top plate 55 and a bottom plate 56. In another embodiment, the outlet also is comprised of two side plates or sides 50, 51 extending from opposite side edges of the top plate 55 and contacting the respective side edges of the bottom plate 56. The outlet 17 also has an outlet edge 22 for producing a waterfall as the water flows out of the water conduit 16. Another embodiment, illustrated in FIG. 2, comprises a bottom plate 56 and sides 50, 51 without a top plate 55. Though not illustrated, another embodiment comprises a bottom plate 56 without a top plate 55 and side plates 50, 51.

As shown in FIG. 1, the waterfall apparatus 10 is formed to include an enclosed water conduit 16 in order to facilitate its installation into a pool or spa structure, as illustrated in FIG. 3. A wall 24 forms a water barrier for a pool of water 26. The water conduit 16 is disposed on top of wall 24 and is formed of metal or other material capable of bearing the weight of the concrete coping 28 or other decking material surrounding the pool of water 26. The inlet 18 of the waterfall apparatus 10 is connected to water supply pipe 30 for providing water to the waterfall 32. As is known in the art, the water used for the waterfall may be recycled from the pool of water 26. The water may be directed from the inlet 18 into a water distribution apparatus 34, as may be seen in both FIGS. 1, 2, and 3.

The water distribution apparatus 34 helps to direct a laminar flow of water to the outlet edge 22 in order to provide an attractive waterfall effect. As previously discussed, in other embodiments, the outlet 17 need not be a closed structure, but rather may include only a bottom plate 56 for conveying the water along its upper surface from the inlet 18 to the outlet edge 22. The bottom plate 56 may be flat or may have a curved surface to help to direct the flow of water. Conduit 16 comprised of an outlet 17, plate 56 and similar structures may be referred to collectively as water directing structures.

Fiber optic cable bundle 12 is enclosed within a fiber conduit 38 attached to a top portion of the water conduit 16. A plurality of holes 40 are formed in the outlet 17, and the output ends 42 of the respective individual fibers 14 are disposed in or through the holes 40 to direct light downward into the outlet 17 and onto water flowing inside the water conduit 16. Advantageously, light emitted from the fiber ends 42 illuminates the water and the water remains illuminated as it flows from the waterfall apparatus 10. The applicant has found that such illumination provides a pleasing glow and lighting effect as though the water is illuminated at it leaves the outlet edge 22 and flows into the pool of water 26. The input ends 46 of the fibers 14 may be connected to a light source 48, as is known in the art, for providing white light or light of one or more predetermined wavelengths. As is known in the prior art, light source 48 may be placed at a distance from the waterfall 10. Though not shown, to provide protection to the fiber optic fibers 14, bundle 12 and fiber conduit 38, a cover is placed over this components.

Figure 2:
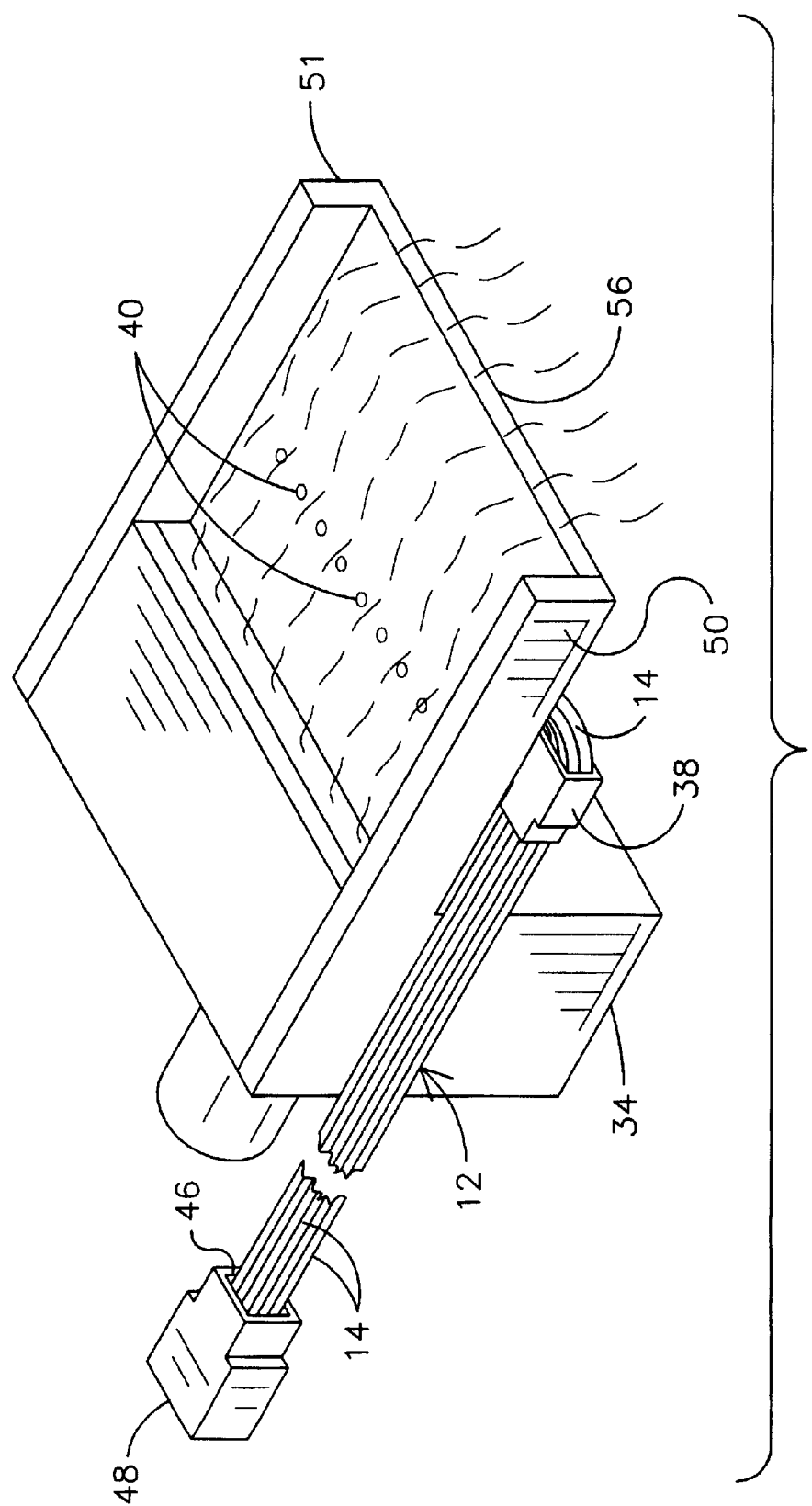
FIG. 2 is a perspective view of a waterfall apparatus as illustrated in FIG. 1 without a top plate.

The holes 40 are not limited to being placed on top of a water conduit 16. The holes 40 may be placed on one or both sides 50, 51 of the water conduit 16 or in the bottom plate 56. For example, as disclosed earlier, if the outlet 17 is not a closed structure, but rather has only a bottom plate 56 for conveying the water along its upper surface from the inlet 18 to the outlet edge 22, as illustrated in FIG. 2, the holes 40 may be placed through the bottom plate 56. The fiber conduit 38 is then attached to either a side portion or bottom portion of the bottom plate 56. The output ends 42 of the respective individual fibers 14 are disposed in or through the holes 40 to direct light upward or inward into the bottom plate 56 and onto water flowing over the bottom plate 56.

The fibers 14 may be of a design known in the art to emit light from their ends, such as the End-Glow™ cables sold by Super Vision International, Inc. The width W of the water fall is not limited by the capability of an individual side glow cable nor by the efficiency of an acrylic tube. Furthermore, light may be provided from the ends of optical fibers without passing through additional connectors associated with the waterfall structure. Any desired width W may be illuminated by incorporating an appropriate number of fibers into the waterfall apparatus 10 as necessary to achieve a desired light intensity. For very wide waterfalls, it may be desirable to provide a plurality of fiber conduits 38 and fiber bundles 12 in order to reduce the diameter of the bundle 12. Furthermore, it may be desirable to have holes 40 in more than one aspect of the conduit 16, such as the top and side walls of the outlet 17, to direct a portion of the fiber output ends 42 in a direction other than downward. Moreover, different individual fibers 14 may be provided with light of a different wavelength or a changing wavelength to provide a desired effect.

While preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A waterfall apparatus comprising:
   a water conduit having an inlet for receiving water into the interior of the water conduit and having an outlet formed by a top plate and bottom plate for producing a waterfall as the water flows out of the water conduit;
   a fiber optic cable bundle attached to the water conduit, the fiber optic cable bundle comprising a plurality of fibers, each fiber adapted to receive light at an input end and to emit light at an output end;
   a plurality of holes formed in at least one of said top plate and said bottom plate;
   wherein the output ends of the fibers are disposed in respective ones of the plurality of holes where the fibers direct light onto water in the outlet.

2. The waterfall apparatus of claim 1, further comprising a fiber conduit attached to the outlet and operable to contain the fiber optic cable bundle.

3. The waterfall apparatus of claim 1, further comprising a light source connected to the fiber optic cable bundle and operable to direct light into the input ends of the plurality of fibers.

4. The waterfall apparatus of claim 1 wherein the water conduit is further formed by side plates and further comprising a plurality of holes formed in at least one of a side plate wherein the output ends of the fibers are disposed in respective ones of the plurality of holes.

5. A waterfall apparatus comprising:
   a plate having an inlet for receiving water to flow along an upper surface of the plate for producing a waterfall as the water flows off the plate;
   a fiber optic cable bundle comprising a plurality of fibers, each fiber adapted to receive light at an input end and to emit light at an output end;
   a plurality of holes formed in the upper surface of the plate;
   wherein the output ends of the respective fibers are disposed in respective ones of the plurality of holes.

6. The waterfall apparatus of claim 5, further comprising a fiber conduit attached to the plate proximate the plurality of holes and operable to contain the fiber optic cable bundle.

7. The waterfall apparatus of claim 5, further comprising the output ends being positioned to emit light onto water located on the upper surface of the plate.

8. The waterfall apparatus of claim 5, further comprising a light source connected to the fiber optic cable bundle and operable to direct light into the input ends of the plurality of fibers.

9. The waterfall apparatus of claim 5, further comprising side plates extending upward from opposite side edges of the upper surface and comprising a plurality of holes formed in an opposed side plate wherein the output ends of the respective fibers are disposed in respective ones of the plurality of holes.

10. A method of illuminating a waterfall, the method comprising the steps of:
    providing a plurality of optical fibers, each fiber operable to receive light at an input end and to emit light at an output end;
    providing a plurality of holes formed in the waterfall;
    disposing the output ends of the respective fibers through each respective hole;
    directing water through the waterfall apparatus to form a waterfall; and
    illuminating water in the waterfall by providing light into the input ends of the respective fibers.

11. The method of claim 10, further comprising the step of positioning the respective output ends to direct light onto water located within the waterfall.

12. The method of claim 10, further comprising the step of providing light of a predetermined wavelength into the input ends of the respective fibers.

13. A waterfall apparatus comprising:
    a water directing structure having an inlet for receiving a flow of water and having an outlet with an edge for producing a waterfall;
    an optical fiber having an output end operable to emit light;
    a hole formed in the outlet distant from the edge;
    wherein the output end is disposed through the hole.

14. The waterfall apparatus of claim 13 wherein the output end is operable to direct light onto water within the outlet.

* * * * *